United States Patent

Hammer et al.

Patent Number: 4,547,688
Date of Patent: Oct. 15, 1985

[54] DYNAMOELECTRIC MACHINE WITH ROTOR VENTILATION SYSTEM INCLUDING PREWHIRL INLET GUIDE VANES

[75] Inventors: Joel B. Hammer, Plum Borough; Richard A. Gronholm, East Pittsburgh, both of Pa.

[73] Assignee: Westinghouse Electric Corp., Pittsburgh, Pa.

[21] Appl. No.: 607,854

[22] Filed: May 7, 1984

[51] Int. Cl.⁴ ............................................. H02K 9/00
[52] U.S. Cl. ....................................... 310/59; 310/52; 310/54; 310/64; 310/260; 310/270
[58] Field of Search ..................... 310/270, 52, 53, 55, 310/58, 59, 60 R, 64, 65, 214, 60 A, 54, 61, 260

[56] References Cited

U.S. PATENT DOCUMENTS

| | | | |
|---|---|---|---|
| 2,561,737 | 7/1951 | Hill | 310/65 |
| 2,618,756 | 11/1952 | Fechheimer | 310/65 |
| 2,752,515 | 6/1956 | Baudry | 310/64 |
| 2,915,655 | 12/1959 | Baudry | 310/64 |
| 2,920,218 | 1/1960 | Beckwith | 310/64 |
| 3,110,827 | 11/1963 | Baudry | 310/61 |
| 3,870,907 | 3/1975 | Hoffman | 310/64 |
| 4,465,947 | 8/1984 | Armor | 310/59 |

Primary Examiner—R. Skudy
Attorney, Agent, or Firm—G. H. Telfer

[57] ABSTRACT

An electrical machine with a radial path air-cooled rotor is provided with prewhirl inlet guide vanes in the coolant inlet duct. The guide vanes are fixed members spaced from each other in an arc around the duct with their radial inward edges advanced in the direction of rotation of the rotor from the radial outer edges and preferably have a smoothly curved airfoil configuration so as to smooth and facilitate air flow through the end turn region and the slot channels.

4 Claims, 3 Drawing Figures

DYNAMOELECTRIC MACHINE WITH ROTOR VENTILATION SYSTEM INCLUDING PREWHIRL INLET GUIDE VANES

The Government has rights in this invention pursuant to Contract No. N00024-79-C-4175 awarded by the Department of the Navy.

BACKGROUND AND SUMMARY OF THE INVENTION

This invention relates to dynamoelectric machines with a radial path air-cooled rotor and particularly to means for improving coolant flow therethrough.

The subject matter of commonly assigned Application Ser. No. 552,592, filed Nov. 16, 1983 by Pavlik et al., now U.S. Pat. No. 4,508,885 and Ser. No. 607,853, filed of even date herewith by Hammer et al., is incorporated herein by reference.

In the earlier copending application are described the general characteristics of machines with radial path air-cooled rotors as they have been made heretofore and an improvement thereto for providing better flow into the slot channels by means of a channel inlet fairing. This provides better cooling of the rotor so that machine size and noise can be reduced. The present invention has to do with machines of the same general character but with another aspect for improving coolant flow and reducing machine size and noise.

In addition, the above-mentioned second copending application relates to other features for similar purposes. It is advantageous to employ the features of the above-mentioned applications, either individually or together, with those of the present invention. However, any of such features may be individually used to improve the cooling of machines.

In machines with radial air cooling of the rotor in accordance with the prior art, the air is supplied to the end turn region through a stationary inlet duct that extends substantially radially from the periphery of the machine. The air then flows radially inward from the inlet duct, entering the interior to the retaining ring and field winding end turns and flowing in the axial direction with little or no tangential velocity component. Part of the air flows radially outward, cooling the end turns and exits the retaining ring through ventilation holes. The remaining air passes into the field winding slot channels and hence radially outward through a number of slits in the field winding, cooling the body portion of the winding. The air then exits through radial holes in the rotor wedges and enters the air gap. The air from the body portion of the winding flows axially and circumferentially along the air gap and joins the air from the end turn portion of the winding. This combined exhaust flow then is dumped interior to the machine enclosure and exits through the cooler where heat is removed. The air then continues to recirculate.

In such a configuration, the rotor itself is the blower which must produce the required pressure-volume characteristics to obtain the desired flow. If the rotor is unable to meet the requirements, present practice dictates that rotor mounted blowers be employed which have the adverse effects of increasing machine weight and size, airborne noise levels and power consumption.

The present invention provides a means to decrease the inlet pressure loss for the coolant gas entering the field winding subslots and end turns by an amount approximately equal to the available driving differential static pressure produced by the rotor.

The flow path is improved by modifying the inlet duct configuration to include means for rotationally directing coolant out of said duct in the direction of rotation of the rotor. This means comprises, for example, a plurality of inlet guide vanes in fixed locations between axially inner and outer walls of the inlet duct. The guide vanes are each a member extending substantially the entire distance between the walls of the duct proximate the end of the inlet duct adjacent the end turns. They are on an angle relative to a direct radius from the shaft axis so that their radial lower edge is circumferentially spaced from their upper edge in the direction of rotor rotation. Preferably, each of the inlet guide vanes has an airfoil configuration with smoothly curved major surfaces between their upper and lower edges and those edges are smoothly rounded. The vanes may take other forms so long as they impart a tangential velocity to the coolant as it leaves the inlet duct. The invention is also useful in combination with the features addressed by one or both of the above-mentioned copending applications although it may also be independently used.

DESCRIPTION OF THE PREFERRED EMBODIMENTS

Figure 1:
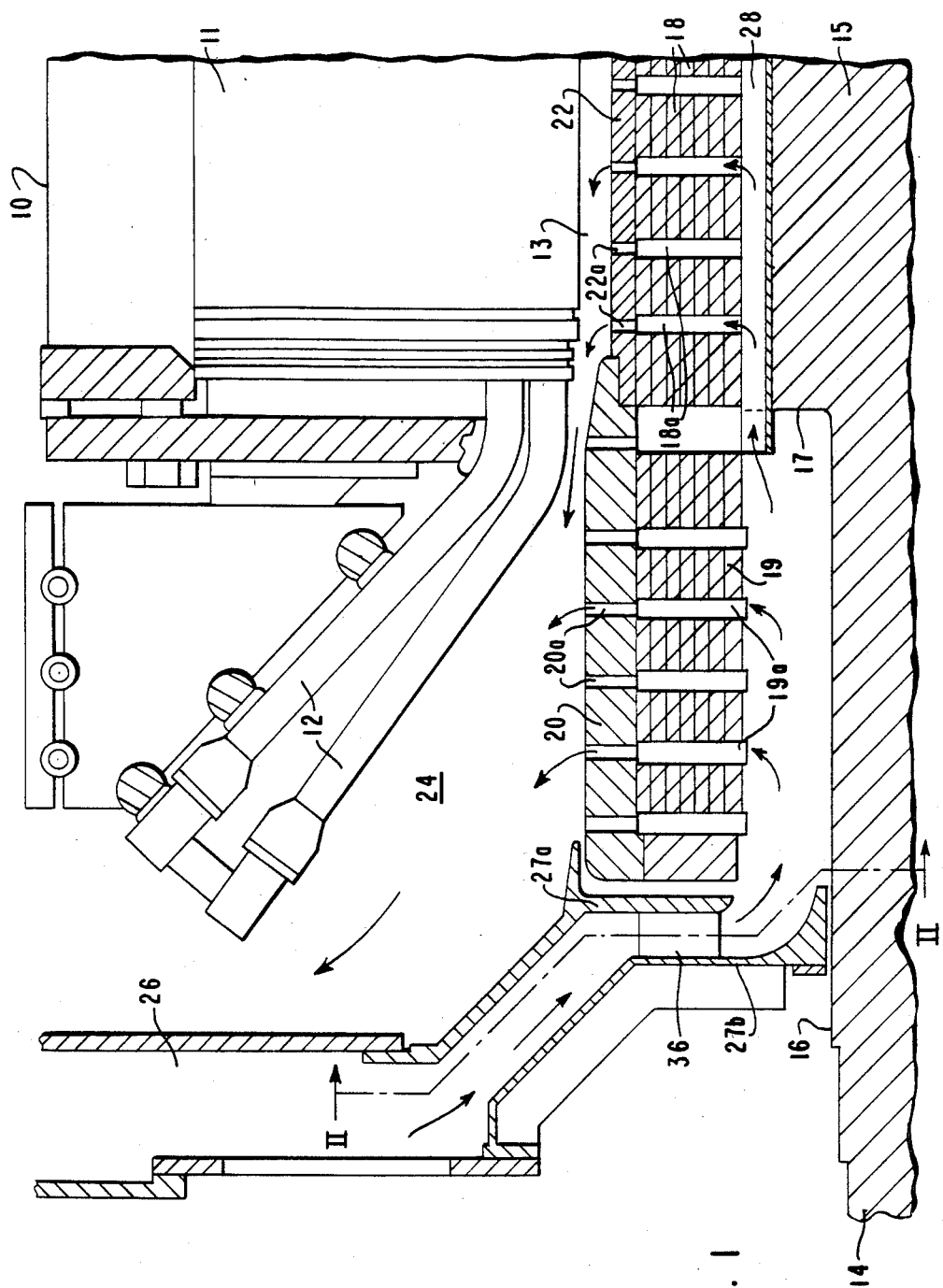
FIG. 1 is a cross-sectional view of a portion of the end turn region of a dynamoelectric machine in accordance with an embodiment of the present invention.

Referring to FIG. 1, a dynamoelectric machine is shown with a stator 10 having a core 11 and coil windings of which the end turns 12 are shown extending axially beyond the ends of the core. The view is of the upper portion of one end of such a machine. A rotor 14 is centrally disposed on a shaft 16 for rotation within the stator 10 with an air gap 13 therebetween. The rotor 14 has a body portion 15 with axially opposing end faces of which a portion of one end face 17 is shown. The body portion 15 has a plurality of axially extending coil slots through one of which the section view is made. In each of the coil slots are located coils 18 of a number of conductive turns with end turns 19 extending axially beyond the end face 17.

A retaining ring 20 is located radially around the rotor end turns 19 at each end of the machine. A wedge 22 closes the coil slot in the rotor body 17. There are radial coolant passages 18a, 19a, 20a, and 22a, respectively, through the inner portion of the rotor coils 18, the end turns 19, the retaining ring 20 and the wedge 22. The passages 18a and 22a through the rotor coils 18 and through the wedge 22 directly communicate to the air gap 13. The passages 19a and 22a through the end turns 19 and the retaining ring 20 communicate to an exhaust passage 24 that is axially outward from and in communication with the air gap 13.

For a more complete overall view of a machine of the same general character, reference is made to the above-mentioned application Ser. No. 552,592, now U.S. Pat. No. 4,508,985.

FIG. 1 further shows a coolant inlet duct 26 for supplying a coolant gas such as air to radially inward ends of the end turn coolant passages 19a and also to a channel 28 extending through the coil slot to the radial inward ends of the coolant passages 18a in the body portion 15. Air flow direction is shown by the arrows. The air comes radially inward through the inlet duct 26 and axially under the end turns 19. Some of the air enters the slot channel 28. Some of the air thus passes through each of the radial coolant passages 19a and 20a of the end turns 19 and retaining ring 20 as well as passages 18a and 22a of the coils 18 in the body 15 and the wedge 22.

The principal improvement provided by this invention is that the coolant inlet duct 26 has in it means 36 for rotationally directing coolant out of the duct in the direction of rotation of the rotor. Referring to both FIG. 1 and FIG. 2, the means 36 for rotationally directing coolant is a plurality of inlet guide vanes 36a in fixed locations between first and second duct walls 27a and 27b of the inlet duct 26 that are adjacent the end turns. The inlet guide vanes 36a are each a member extending substantially the entire distance axially between the duct walls 27a and 27b proximate the end of the inlet duct 26 adjacent the end turns 19.

Figure 2:
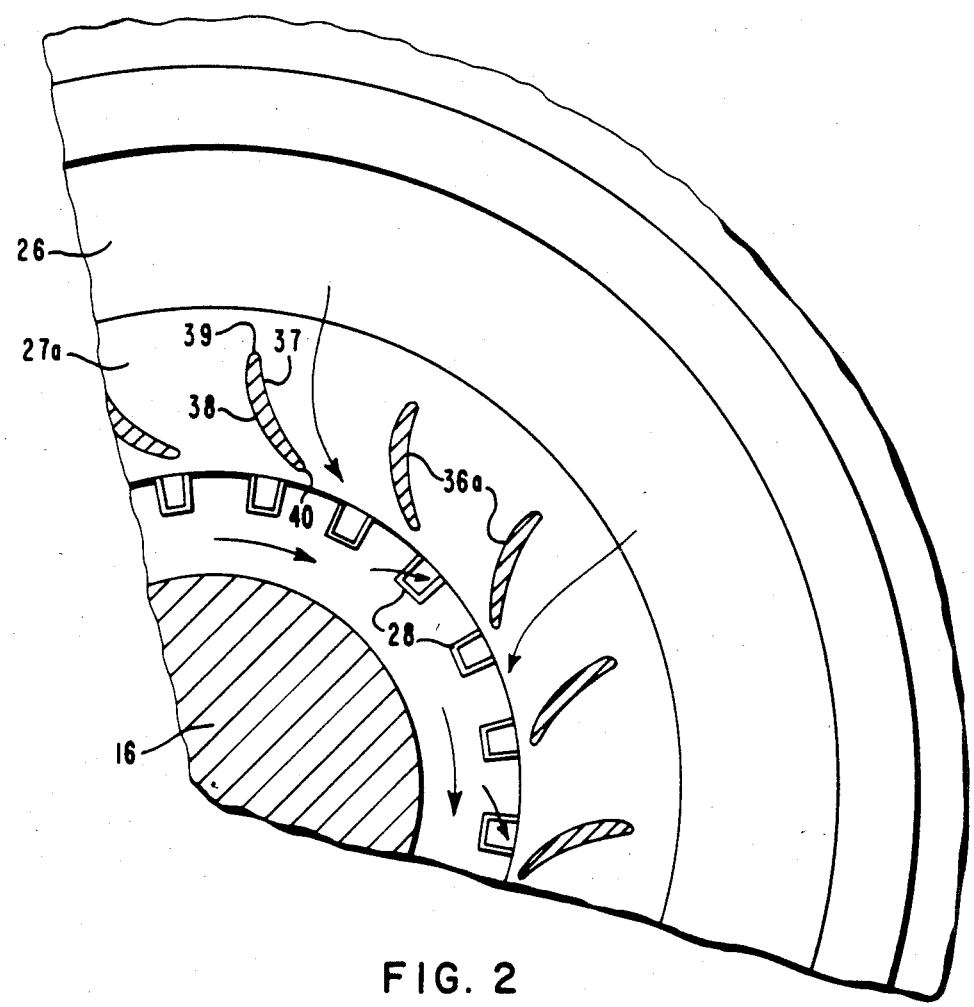
FIG. 2 is a partial view of the structure of FIG. 1 taken generally along the line II—II of FIG. 1.

In preferred forms as shown in FIG. 2, each of the inlet guide vanes 36a has an airfoil configuration with smoothly curved major surfaces 37 and 38 between the upper and lower edges 39 and 40 and those edges are smoothly rounded. The curved surfaces 37 and 38 give a tangential component of velocity to the coolant. The inlet guide vanes 36a could have flat surfaces and thus a generally rectangular cross section but with the disposition of the lower edge ahead, in the direction of rotation, of the upper edge. The vanes 36a in FIG. 2 have both a leading lower edge 40 and curved surfaces 37 and 38.

It is preferred that the portions of the inlet duct walls 27a and 27b adjacent the axial extreme of the end turns 19 be the location of the inlet guide vanes so as to impart the rotational motion to the coolant immediately prior to the coolant's discharge into the end turn region.

In accordance with the invention, the coolant gas entering interior to the end turns 19 is provided with a tangential component of velocity such that upon arriving at the inlets to the field winding channels 28 it is moving with the same tangential speed as are the subslot inlets. This is also approximately the case for the air speed relative to the passages 19a for the field winding end turns. This speed matching essentially eliminates the pressure drop associated with the relatively high velocity flow into the channels 28 (and passages 19a) encountered by the coolant gas in prior designs.

Also, the inlet guide vane induced tangential velocity component of the air reduces the work input that the rotor 14 imparts to the air. This both reduces power consumption by the rotor and air temperature rise. In addition to reducing air temperature by reducing rotor work input, an air static temperature decrease occurs which corresponds to the increased kinetic energy of the air due to the inlet guide vane induced tangential velocity. Thus, lower temperature air is delivered to the field winding 18 and 19.

By being able to eliminate the use of additional blowers, the overall size, weight and cost of the machine is reduced. A further advantage occurs in circumstances where low noise is of importance, such as shipboard machines, and results from the fact that the siren effect of the periodic channels 28 is greatly reduced by having the air tangential speed up to the subslot inlet speed. This speed matching reduces chopping of the air by the subslot inlets.

Figure 3:
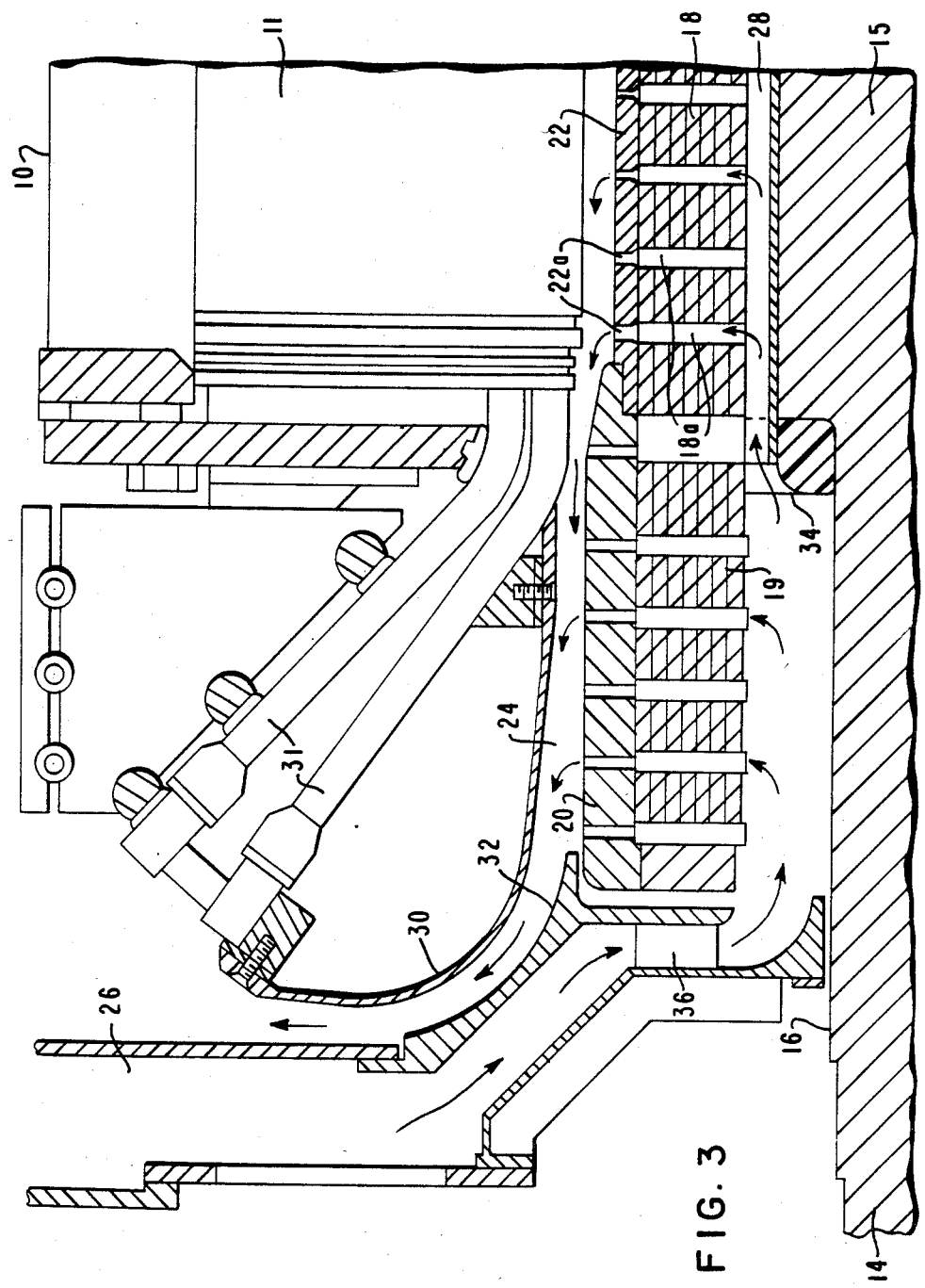
FIG. 3 is a further cross-sectional view of an arrangement generally like that of FIG. 1 but with further modifications.

Referring to FIG. 3, a view of a machine similar to that of FIG. 1 is shown with, however, three individual modifications that may be separately or together used with the structure as depicted in FIGS. 1 and 2. From present information, all of the features of FIG. 3 would preferably be used together to provide most affective cooling for the machine. The elements of FIG. 3 common to those of FIG. 1 are like numbered.

A first modification in FIG. 3 is that at the inlet to the slot channel 28 on the rotor body there is an inlet fairing 34 for smoothing the flow entrance into the channel 28 in a manner that is more particularly described in the above-mentioned application Ser. No. 552,592, now U.S. Pat. No. 4,508,985. The slot channel 28 is formed to fit in the bottom of the coil slot. It has an open interior for air flow and an upper surface that is open for air flow into the coolant passages 18a but provides support for the coils 18.

A second modification of FIG. 3 as compared to FIG. 1 is that the wedge 22 which helps to secure the coils 18 in the coil slots in the rotor body has coolant passages 22a of differing dimensions. As shown, outer ones of the passages 22a have a greater cross-sectional area than others of the passages at a central portion of the rotor body. This has been determined to contribute to the uniformity of cooling of the rotor to avoid temperature differentials therein and results in improvement in reduced machine size and noise along with the other improvements of the combination.

A third modification of FIG. 3 as compared to FIG. 1 is that a shell structure 30 of a smoothly curved configuration is disposed about the stator end turns 31, preferably with a like smoothly curved portion 32 on the inner wall of the air inlet duct 26. The stator shell structure 30 smooths and facilitates air flow through the exhaust passage 24 and serves as a gas diffuser and noise baffle as more particularly described in copending application Ser. No. 607,853.

Therefore, it is seen that the invention as shown and described herein, subject to further variations that are in accordance with the skill of the art of dynamoelectric machine cooling, gives designers new opportunities and design flexibility in achieving compact, lightweight and low noise machines without the sacrifice in machine rating that would be required without the invention.

What we claim is:
1. A dynamoelectric machine comprising:
a stator with a core and coil windings having end turns extending axially beyond ends of said core;
a rotor centrally disposed on a shaft for rotation in a given direction within said stator with an air gap therebetween;
said rotor comprising a body portion with axially opposing end faces, said body portion having a plurality of axially extending coil slots with coils located therein and coil end turns extending axially beyond each end of said rotor body portion;
said coil slots also each having a coolant channel extending axially therethrough under said coils, said coils having radial coolant passages communicating with said coolant channel and said air gap, said end turns also having radial coolant passages;

a stationary coolant inlet duct for supplying a coolant gas to the radially lower side of said end turns and to said axial coolant channels; and said coolant inlet duct having a first wall adjacent the axial extremity of said end turns and a second wall spaced axially outward from said first wall and extending to a location proximate said shaft, said coolant inlet duct having therein means for rotationally directing coolant out of said duct in the direction of rotation of said rotor, said means for rotationally directing coolant comprising a plurality of inlet guide vanes in fixed locations between said first and second walls of said inlet duct.

2. A dynamoelectric machine in accordance with claim 1 wherein:

said inlet guide vanes each comprise a member extending substantially the entire distance between said first and second walls proximate the end of said inlet duct adjacent said end turns and have a radially upper edge and a radially lower edge with said lower edge circumferentially spaced from said upper edge in said direction of rotation.

3. A dynamoelectric machine in accordance with claim 1 wherein:

said inlet guide vanes each have an airfoil configuration with smoothly curved major surfaces between said upper and lower edges and said upper and lower edges are smoothly rounded.

4. A dynamoelectric machine in accordance with claim 1 wherein:

said inlet duct has a substantially radial portion adjacent the axial extreme of said end turns and said means for rotationally directing coolant are a plurality of inlet guide vanes circumferentially spaced from each other within said radial portion of said inlet duct.

* * * * *